(12) United States Patent
Grimm (10) Patent No.: US 11,181,231 B2
(45) Date of Patent: Nov. 23, 2021

(54) ACTUATOR

(71) Applicant: Euchner GmbH+ Co. KG, Leinfelden-Echterdingen (DE)

(72) Inventor: Ilo Grimm, Waldenbuch (DE)

(73) Assignee: Euchner GmbH + Co. KG, Leinfelden-Echterdingen (DE)

( * ) Notice: Subject to any disclaimer, the term of this patent is extended or adjusted under 35 U.S.C. 154(b) by 656 days.

(21) Appl. No.: 16/152,437

(22) Filed: Oct. 5, 2018

(65) Prior Publication Data

US 2019/0112838 A1 Apr. 18, 2019

(30) Foreign Application Priority Data

Oct. 18, 2017 (EP) .................................. 17197168
Nov. 15, 2017 (EP) .................................. 17201849

(51) Int. Cl.
| | | |
|---|---|---|
| *E05B 47/00* | (2006.01) | |
| *E05B 63/12* | (2006.01) | |
| *E05B 65/10* | (2006.01) | |
| *F16P 3/08* | (2006.01) | |
| *H01H 27/00* | (2006.01) | |
| *H01H 3/16* | (2006.01) | |
| *F16P 3/10* | (2006.01) | |

(52) U.S. Cl.
CPC ........ *F16P 3/08* (2013.01); *F16P 3/10* (2013.01); *H01H 3/163* (2013.01); *H01H 27/007* (2013.01); *E05B 47/0012* (2013.01); *H01H 2300/032* (2013.01)

(58) Field of Classification Search
USPC ......................................................... 74/162
See application file for complete search history.

(56) References Cited

U.S. PATENT DOCUMENTS

| | | | | |
|---|---|---|---|---|
| 5,005,886 A | * | 4/1991 | Carroll ................... | E05C 1/163 292/169.17 |
| 5,062,668 A | * | 11/1991 | Onderka ................ | H01H 3/163 292/25 |
| 5,938,383 A | * | 8/1999 | Dirmeier ............... | F16B 31/021 411/5 |
| 10,727,707 B2 | * | 7/2020 | Ballweg .................. | H02K 1/28 |
| 2009/0071262 A1 | * | 3/2009 | Schmid .................. | G01B 5/30 73/859 |
| 2011/0315726 A1 | * | 12/2011 | Huhn ....................... | B60R 9/04 224/329 |

(Continued)

FOREIGN PATENT DOCUMENTS

| | | |
|---|---|---|
| EP | 0367026 A2 | 5/1990 |
| WO | 201515744 A1 | 10/2015 |
| WO | 2016058718 A1 | 4/2016 |

*Primary Examiner* — Toan T Vu
*Assistant Examiner* — Xuan Ly
(74) *Attorney, Agent, or Firm* — Michael Soderman (57) ABSTRACT

An actuator (3) for a safety switch (2) with an actuator head (8), said actuator head being mounted to a core body (6) by means of a connection element (7). The actuator head (8) has, at least in parts, a larger cross section than the connection element (7). The connection element (7) is rigid in the axial direction. The actuator head (8) is held in a base position by means of the connecting element (7). In this base position, the longitudinal axis of the connection element (7) runs at an angle of inclination to the surface of the core body (6).

15 Claims, 6 Drawing Sheets

(56) References Cited

U.S. PATENT DOCUMENTS

2014/0182059 A1* 7/2014 Jonsson .............. A61G 7/1049
            5/89.1
2016/0156351 A1* 6/2016 Pizzato .............. H03K 17/965
            307/326

* cited by examiner

ACTUATOR

CROSS REFERENCE TO RELATED APPLICATIONS

This application claims the priority of EP 17197168.2 filed on 2017 Oct. 18 and the priority of EP 17201849.1 filed on 2017 Nov. 15; all applications are incorporated by reference herein in their entirety.

BACKGROUND

The invention relates to an actuator for a safety switch. Together with an associated safety switch, such an actuator provides a safety switch arrangement used in the area of safety technology. For use in the area of safety technology, especially in the area of personal protection, the safety switch arrangement must meet standard-compliance requirements with regard to error security, such that it is ensured that an appropriately safe monitoring function can be executed using the safety switch arrangement. Such a safety switch arrangement can typically be used to secure access to a hazard area. For example, a safety switch arrangement can be used for locking a dividing protective element, such as a safety door providing access to a hazard area. In this case, a hazardous system inside the hazard area can only be released for operation if the safety door is locked using the safety switch arrangement. The release of the system can be performed using a safety control unit to which safety-related control signals are transmitted.

For latching the safety door when the safety door is in its closed position, the actuator, in the form of a latch or similar, is brought into engagement with the safety switch by, for example, inserting the actuator into a recess of the safety switch. This latching is controlled by means of an RFID reader in the safety switch which detects a transponder in the actuator.

In addition to this latching, locking of the safety door may be provided. Such a locking device is known, for example, from WO 2016/058718 A1. In this locking device, a locking bolt is provided that is actuated by means of an electric motor having a planetary gear train. With the electric drive, the locking bolt can be moved into a blocking position in which the actuator is locked by the locking bolt.

SUMMARY

The invention relates to an actuator (3) for a safety switch (2) with an actuator head (8), said actuator head being mounted to a core body (6) by means of a connection element (7). The actuator head (8) has, at least in parts, a larger cross section than the connection element (7). The connection element (7) is rigid in the axial direction. The actuator head (8) is held in a base position by means of the connecting element (7). In this base position, the longitudinal axis of the connection element (7) runs at an angle of inclination to the surface of the core body (6).

DETAILED DESCRIPTION

The invention seeks to solve the problem of providing a compact actuator for a safety switch arrangement that enables a reliable safety function.

For solving this problem, the features of claim 1 are provided. Advantageous embodiments and useful further developments of the inventions are described in the dependent claims.

The invention relates to an actuator for a safety switch with an actuator head, said actuator head being mounted to a core body by means of a connection element. The actuator head has, at least in parts, a larger cross section than the connection element. The connection element is rigid in the axial direction. The connection element holds the actuator head in a base position in which the longitudinal axis of the connection element runs at an angle of inclination to the surface of the core body.

The small and compact design of the actuator represents an essential advantage.

The actuator is easy to install and can be used flexibly in combination with a safety switch to create a safety switch arrangement. The safety switch arrangement formed in this manner can generally be used in the area of safety technology, especially for securing access to a hazard area.

The safety switch has a latching unit with which the actuator can be locked into a latched position, i.e., is latchable.

An essential aspect of the invention is that the formation of the actuator with an actuator head mounted at one end of the connection element allows for a very simple and, at the same time, safe and reliable latching of the actuator.

The latching principle is such that the latching unit has an arrangement of latching jaws that delimits the insertion opening, through which the actuator head can be inserted into a latching position.

The actuator head is automatically alignable by a deflection motion towards the insertion opening.

This latching principle is made possible in that the actuator head of the actuator has a larger diameter than the adjacent connection element. Thus, the latching jaws of the latching unit can grip behind the actuator head and securely hold the actuator as a whole in its latching position, which means a positive latching of the actuator is being achieved. The actuator head can have a small design such that the space required for the actuator head in the area of the latching unit can be minimized. This allows not only for a small, compact design of the actuator itself, but also of the associated safety switch.

A latching of the actuator in the latched position is achieved by holding each of the latching jaws of the latching unit with a spring unit by spring force.

The spring forces exerted by the spring units hold the latching jaws in their latching position and thus secure the actuator head of the actuator arranged in the latched position.

The latching jaws of the latching unit are arranged concentrically such that their free ends delimit the insertion opening. In order to transfer the actuator into the latched position, the actuator head is pushed through the insertion opening. The geometry of the actuator head is adjusted such that its diameter is slightly larger than the diameter of the insertion opening. To transfer the actuator, the actuator head is moved with pressure against the insertion opening. As a result, the latching jaws are automatically deflected against the spring force of the spring unit such that the actuator head can pass through the insertion opening. Once the actuator has moved into the latched position, the actuator head is behind the latching jaws, that is to say, the latching jaws have been moved back into their latching positions by the spring forces of the spring unit, gripping behind the actuator head and thus latching the actuator in the latching position and snapping it into place.

The key factor in this respect is that the diameter of the connection element adjacent to the actuator head is smaller than the diameter and, in particular, also smaller than or equal to the diameter of the insertion opening, such that the latching jaws can fully retract into their latched position.

This latching can be easily carried out and, in particular, without any additional control units. The latching mechanism can thus be realized with a minimal effort.

Enabling this latching only requires that the connection element has a high rigidity in the axial direction such that it remains dimensionally stable when the actuator head is pressed against the insertion opening. This way, the actuator head can be moved onto the insertion opening with the necessary pressure force, while deflecting the latching jaws, in order to move the actuator into the latched position.

Furthermore, it is essential that the connection element has such rigidity that it holds the actuator head in a defined base position, regardless of the force of gravity acting. This base position is given by a connection element that runs at a certain angle of inclination to the surface of the core body of the actuator.

Through this defined base position, the actuator head can be directed to the insertion opening in a defined and targeted way, in order to move the actuator into the latched position and to latch it with the latching unit.

It is particularly advantageous that in the base position of the actuator the longitudinal axis of the connection element runs along a straight line oriented perpendicular to the surface of the core body.

Furthermore, reversing the motion of the actuator allows for a release under load, in which the actuator head is pulled from the insertion opening, while deflecting the latching jaws.

In principle, the connection element of the actuator can be made of a rigid material such that the orientation of the connection element relative to the core body is preserved even if external forces act on it.

In accordance with an advantageous embodiment, the connection element of the actuator has high rigidity in the axial direction but can be deflected transversely to the longitudinal axis of the connection element if external forces act on it.

This is advantageously achieved in that the connection element is made of an elastically deformable material.

Thus, the connection element exhibits a degree of flexibility that allows for deflections transversely to its longitudinal axis. The connection element can be made of plastic or a metallic material. It is particularly advantageous that the connection element is a steel cable.

This flexibility of the connection element makes it possible that the actuator is automatically centered on the latching unit while being moved to the safety switch, which guarantees a secure, reliable function of the safety switch arrangement even if the safety switch and the actuator are not exactly aligned with each other.

In the case of a latching unit in the form of concentrically arranged latching jaws that delimit an insertion opening, the actuator need not be exactly aligned with the latching unit, since the actuator head will impact on the edge of at least one latching jaw in the event of a small misalignment. The force exerted on the actuator head deflects the connection element and automatically centers the actuator head on the insertion opening.

The actuator according to the invention can be formed in different geometries.

It is advantageous that the connection element of the actuator has an at least approximately constant cross section over its entire length.

The connection element thus forms a thin, elongated element with a free front end that adjoins the actuator head, said actuator head generally having a width greater than the connection element. In principle, the actuator head can have an oval, polygonal cross section or the like.

It is particularly advantageous if the actuator head is a body formed rotationally symmetric to the longitudinal axis of the connection element, in particular the actuator head being spherical in shape.

The rotationally symmetrical form of the actuator head is of particular advantage if the latching unit has an arrangement of concentric latching jaws which delimit the insertion. The rotationally symmetrical shape of the actuator head is therefore a geometrical optimized adaptation to the latching unit that ensures an even distribution of force of the actuator head on the latching jaws when passing the insertion opening, which in particular ensures a controlled insertion of the actuator into the latched position.

In accordance with a particularly simple embodiment, the actuator head is formed as a metal sheet, in particular a crimped metal sheet.

It is particularly advantageous if the length of the connection element can be adjusted, which allows for an easy adaptation of the actuator to differently formed safety switches and their latching unit. The adjustment can be made, for example, by providing in the core body of the actuator a guide for the connection element. The connection element can then be inserted into the guide at different lengths and fixed there, thus allowing to adjust the length of the part of the connection element protruding beyond the core body.

In accordance with an advantageous embodiment of the actuator, its core body forms a receptacle, by means of which the actuator can be mounted in a door.

This embodiment is optimally adapted for a safety switch arrangement which monitors an access to a hazard area that can be locked by a door, the door in particular being formed as a safety door.

Since the core body of the actuator is formed such that it can be integrated directly into the door, no costly separate fastening means are necessary to connect the actuator with the door. This embodiment is particularly suitable for smaller doors with lower wall thickness, such as glass doors and sheet metal doors.

It is particularly advantageous if the core body has two circular disc-shaped segments connected by a cylindrical segment, which protrude beyond the cylindrical segment. In general, the segments can also have other geometries.

The core body formed in this manner forms a catch means which can be inserted into a recess in the door.

According to a functionally expanded version, the connection element protrudes with the actuator head from a first front side of the core body and a handle element is arranged on the opposite front side of the core body.

Through the integration of the handle element in the actuator, no separate design for mounting a handle needs to be provided on the door, whereby the construction of the door can be simplified.

This construction can be modified such that the core body forms a receptacle for a separate handle element.

In accordance with a further variant, the core body of the actuator is a slot nut.

With this form of the actuator, applications can be covered which require the actuator to be integrated into a profile. By forming the actuator head as a slot nut, the actuator can be integrated directly into the profile.

In accordance with an advantageous embodiment of the safety switch arrangement, the safety switch has a locking unit assigned to the latching unit, which effects the locking of the actuator in the latched position.

Through this locking, the actuator is held securely in the latched condition.

It is further advantageous to monitor the latched position of the actuator by capturing signals from a transponder in the actuator with a reader unit of the safety switch. The transponder can be integrated in the actuator head or also in the core body.

This monitoring function can be used to identify errors in the latching of the actuator. This represents an essential measure to meet the required safety level for the use of the safety switch arrangement in the area of safety technology.

BRIEF DESCRIPTION OF THE DRAWINGS

The invention is explained below based on the drawings. The following is shown in.

DETAILED DESCRIPTION OF THE PREFERRED EMBODIMENTS

Figure 1:
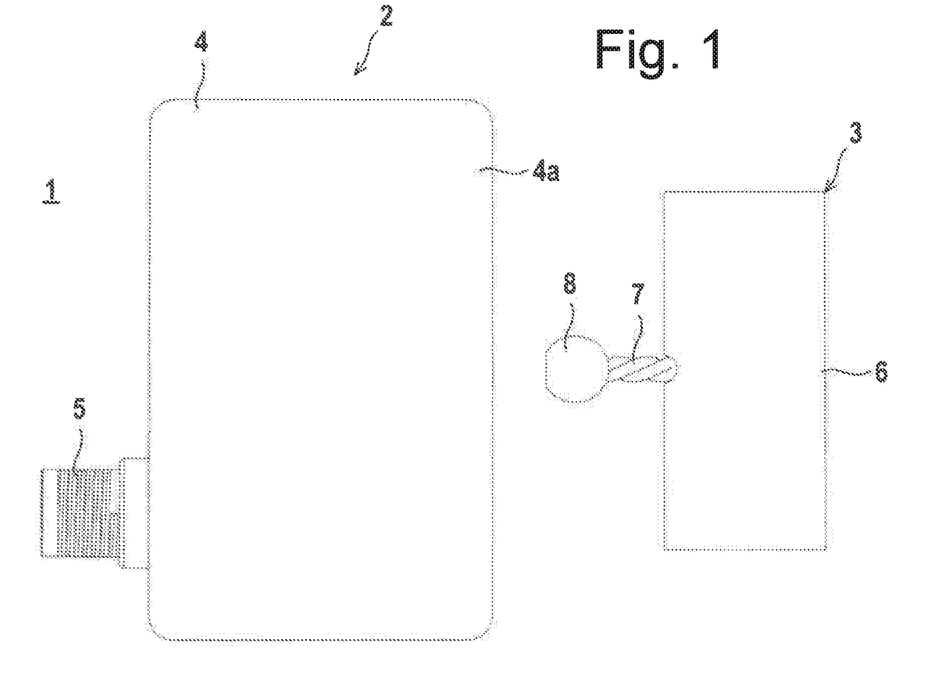
FIG. 1 Exemplary embodiment of the safety switch arrangement in accordance with the invention with a safety switch and an actuator.

FIG. 1 shows schematically an exemplary embodiment of a safety switch arrangement 1 with a safety switch 2 and actuator 3.

This safety switch arrangement 1 can be used, for example, to secure a safety door that serves as access to a hazard area. The actuator 3 can be arranged on the door, the safety switch 2 can be arranged on a frame bounding the door opening which is closed by the safety door.

The components of the safety switch 2 are integrated into a housing 4 from which a cable connector 5 protrudes for connection to external units.

Figure 2:
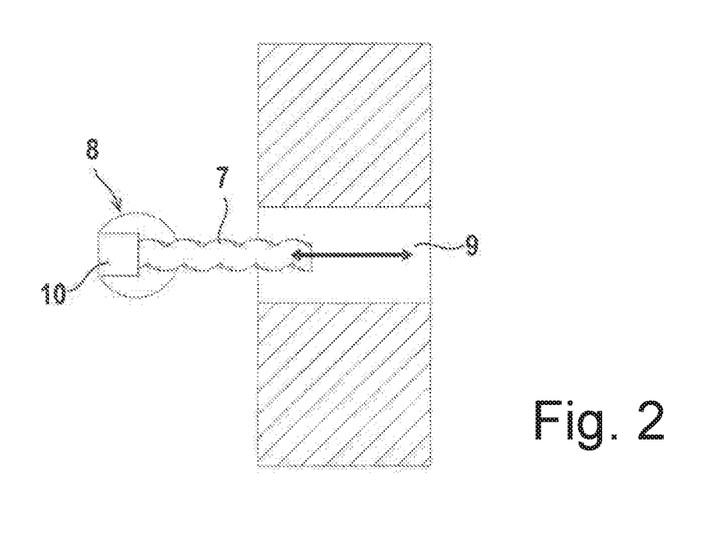
FIG. 2 Longitudinal cross section of the actuator of the safety switch arrangement according to FIG. 1.

As is evident from FIG. 1 and, in particular, FIG. 2, the actuator 3 has a core body 6 in which a connection element 7 is mounted. The connection element 7 is formed by an elongated body, the cross section of which is at least approximately constant over its entire length.

The connection element 7 is mounted in the core body 6 with its first free end such that the longitudinal axis of the connection element 7 is oriented perpendicular to the surface of the core body 6. An actuator head 8 is mounted at the other end of the connection element 7. In the present case, the actuator head 8 is sphere-shaped. In principle, the actuator head 8 can also be formed by another body with rotational symmetry. In principle, the actuator head 8 can also have a polygonal cross-section. In any case, the actuator head 8 has a larger cross-sectional area than the connection element 7, such that the actuator head 8 projects across its entire cross-sectional plane beyond the connection element 7.

In principle, the connection element 7 can be made of plastic or a metallic material. In the present case, the connection element 7 is made of a short piece of steel cable.

In general, the connection element 7 is made of a material that ensures high rigidity of the connection element 7 in the axial direction and which maintains the connection element 7 in its base position shown in FIGS. 1 and 2, especially when the effects of gravity are present. At the same time, the connection element 7 has flexibility, i.e., elastic deformability, such that when exposed to forces, it can be deformed such that the actuator head 8 can be pivoted out along a plane extending transversely to the longitudinal axis.

As shown in FIG. 2 with the double arrow, the connection element 7 is mounted in a guide 9 of the core body 6 such that it can be led out of or inserted into, in particular, pulled out of or pushed into the core body 6, such that the length of the part of the connection element 7 protruding beyond the core body 6 can be varied. The connection element 7 can be fixed at any position.

As is further evident from FIG. 2, a transponder 10 is mounted in the actuator head 8. Alternatively, the transponder 10 can be mounted in the core body 6.

Figure 3:
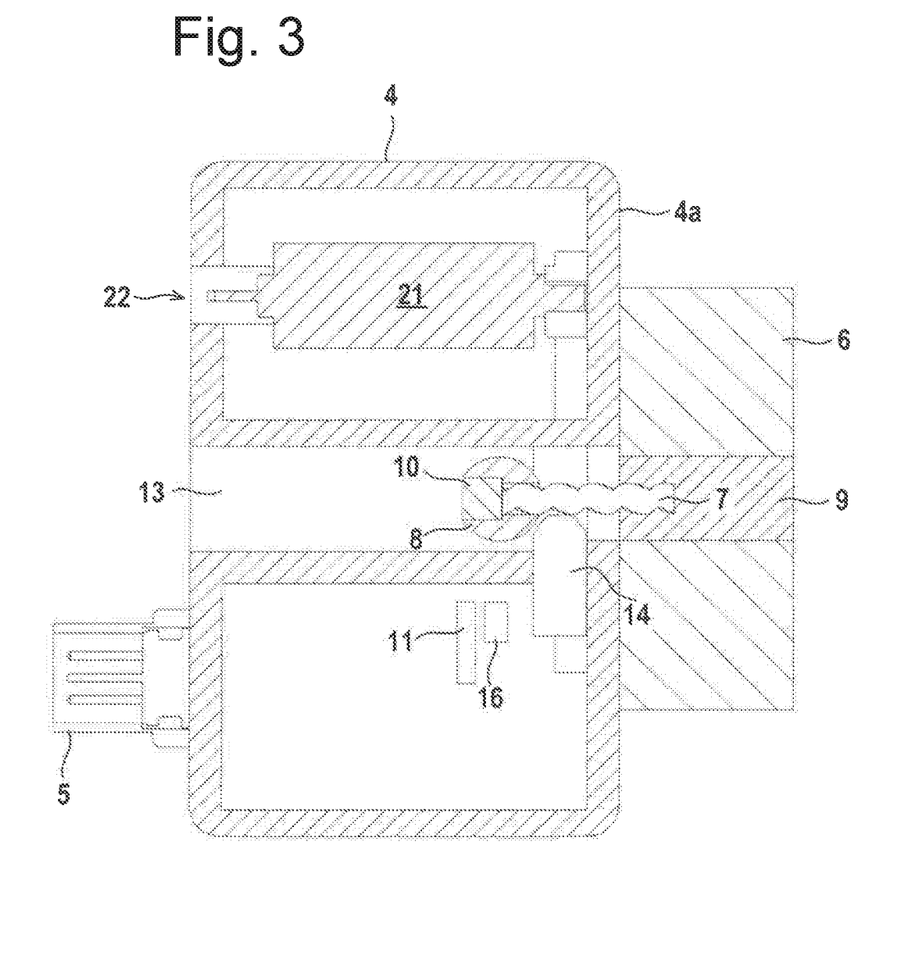
FIG. 3 Longitudinal cross section of the safety switch according to FIG. 1.

As shown in FIG. 3, a reading unit in the form of a reading coil 11 is arranged in the safety switch 2. The reading coil 11 can be used to receive signals sent by the transponder 10 in the actuator head 8 when the actuator 3 has been moved into a latched position in the safety switch 2, as shown furthermore in FIG. 3.

Figure 4A:
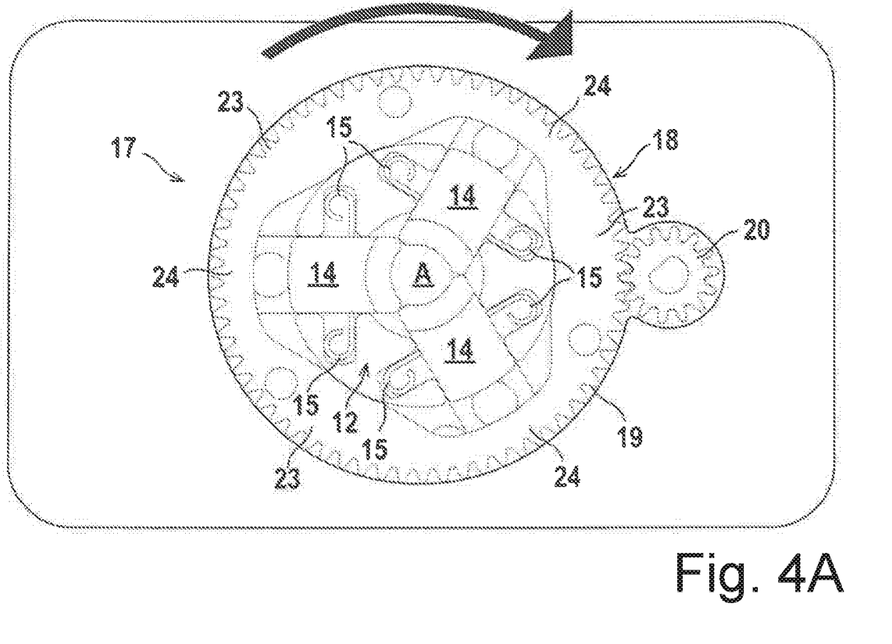
FIG. 4A Depiction of a section of the safety switch from FIG. 1 with the components of a latching unit and a locking unit with locking deactivated FIG. 4B Depiction of a section of the safety switch from FIG. 1 with the components of a latching unit and a locking unit with locking activated FIG. 5A One state of the latching unit and locking unit during insertion of the actuator into a latched position FIG. 5B Another state of the latching unit and locking unit during insertion of the actuator into a latched position.
Figure 4B:
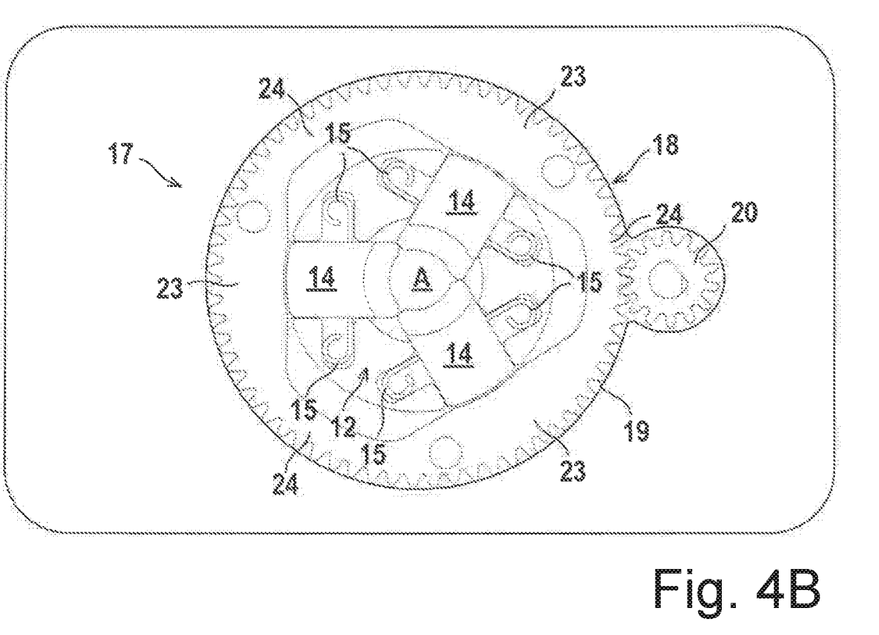

For secure latching of the actuator 3 in its latched position, the safety switch 2 has a latching unit 12, the components of which are shown in a top-down view in FIGS. 4A and 4B. The latching unit 12 is located in the region behind the front wall 4a of the housing 4 of the safety switch 2.

In the latched position of the actuator 3, the actuator head 8 is within a guide channel 13 in the safety switch 2. The components of the latching unit 12 grip behind the actuator head 8, thereby latching the actuator 3, i.e., the actuator 3 is secured against slipping out of the safety switch 2.

In the present case, the latching unit 12 has three identically-formed latching jaws 14 arranged concentrically such that their first free ends delimit an insertion opening A. The longitudinal axes of the latching jaws 14 extend in the radial direction. The extensions of these longitudinal axes intersect at the center of the insertion opening A. Each latching jaw 14 is spring-mounted by means of a spring unit 15 which in the present case is formed by a single spring. The spring forces keep the latching jaws 14 in their latched position shown in FIGS. 4A and 4B.

The latching jaws 14 are arranged in a rotationally-symmetrical manner relative to one another at offsets of 120°. Each latching position of the latching jaws 14 is monitored with a retro-reflective sensor 16.

The latching unit 12 has an associated locking unit 17. The locking unit 17 has a disc-shaped link 18. The outer contour of the link 18 has a toothing 19 that engages with a cog wheel 20. The cog wheel 20 can be placed into rotational motion by means of an electric drive in the form of an electric motor 21, whereby the link 18 also rotates about a rotational axis extending perpendicular to the disc axis.

A mechanical auxiliary unlatching element 22 is associated with the electric motor 21. For example, in the unpowered state of the safety switch 2, the electric motor 21 and thereby also the link 18 can be mechanically rotated by actuating the auxiliary unlatching element 22, e.g., with a screwdriver.

The link 18 has a central cavity within which the latching jaws 14 of the latching unit 12 are arranged. The cavity is delimited by a wall segment of the link 18 that forms an inner contour.

The symmetry of the inner contour matches the symmetry of the latching jaws 14. Accordingly, the inner contour has three identically formed segments 23, rotated by 120°, that serve to lock the latching jaws 14 in place. Two adjacent segments 23 are each connected by an intermediate segment 24 of the inner contour. The intermediate segments 24 are also identically formed.

FIG. 4A shows the locking unit 17 with deactivated locking function. Here the link 18 is rotated by means of the electric motor 21 in a rotary position in which the intermediate segments 24 are in the region of the latching jaws 14. The intermediate segments 24 are formed such that they are at a distance from the rear, second free ends. In this way, the latching jaws 14 can be displaced against the spring forces of the spring unit 15 from their latched positions and can be moved in the direction of the intermediate segments 24.

FIG. 4B shows the locking unit 17 with activated locking. Here the link 18 is rotated by means of the electric motor 21 into a rotary position in which the segments 23 of the inner contour are in the region of the latching jaws 14. The segments 23 of the inner contour bear tightly against the latching jaws 14 such that a movement of the latching jaws 14 from the latched positions is blocked, which effects a locking function.

The transition from the state of deactivated locking (FIG. 4A) into the state of activated locking (FIG. 4B) is achieved through further rotating the link 18 by 60° in the direction shown in FIG. 4A. By further rotating the link 18 another 60°, a state with deactivated locking is reached again, and so on.

Figure 5A:
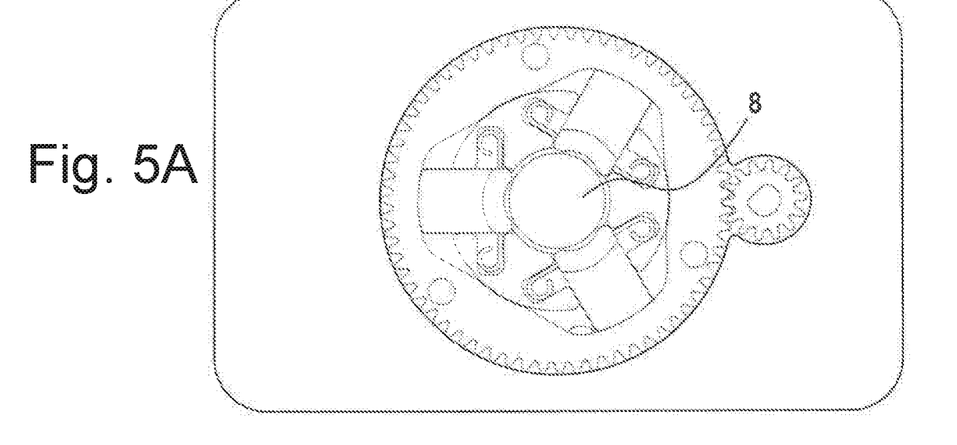
Figure 5B:
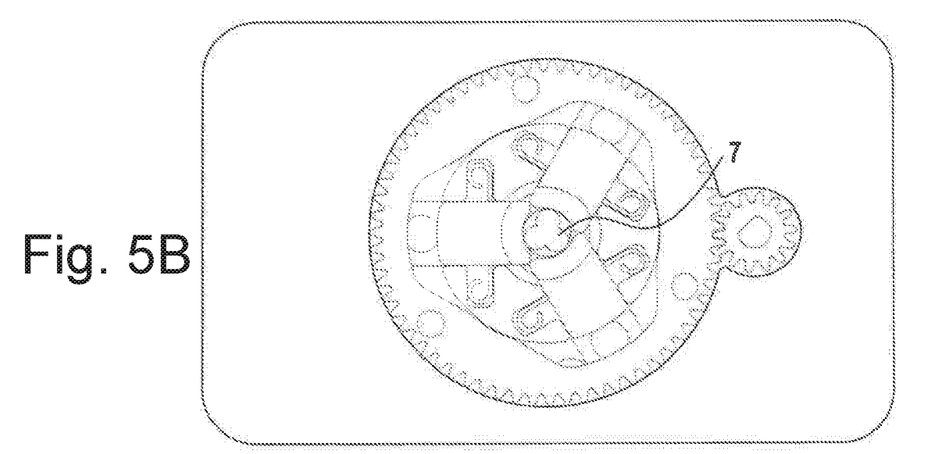
Figure 5C:
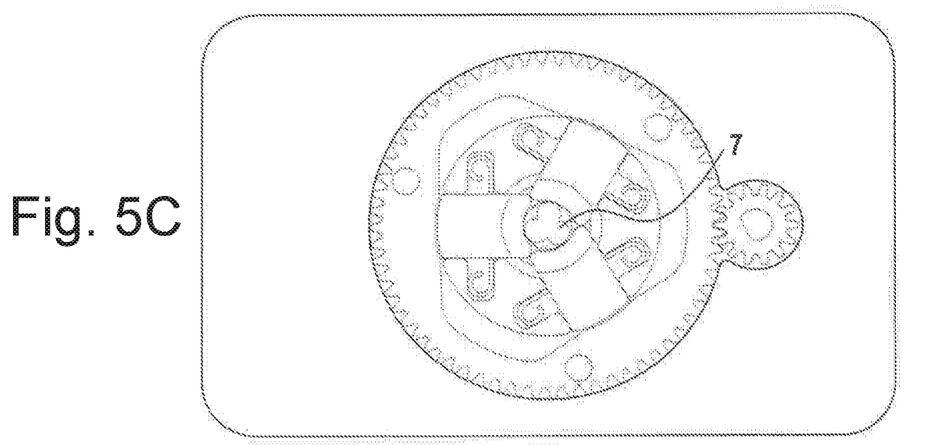
FIG. 5C A further state of the latching unit and locking unit during insertion of the actuator into a latched position.

The functioning of the latching and locking of the safety switch arrangement 1 is explained based on FIGS. 5A to 5C.

In the starting position, for example, with open safety door, the actuator 3 is at a distance from the safety door. When the safety door is closed, the actuator 3 is moved into a latched position inside the safety switch 2.

To do so, first the actuator head 8 is moved against the insertion opening A. Since the actuator head 8 can be arranged transverse to the longitudinal axis of the connection element 7 because of the elastic deformability of the connecting element 7, the actuator head 8 self-centers itself at the insertion opening A. The diameter of the actuator head 8 is larger than the diameter of the insertion opening A. Therefore, when the actuator head 8 is moved against the insertion opening A, the pressure forces exerted by the actuator head 8 on the latching jaws 14 deflect the latching jaws 14 out of their latched position. This is possible since the locking of the locking unit 17 is deactivated, i.e., the intermediate segments 24 are in the region of the latching jaws 14. This situation is depicted in FIG. 5A. The actuator head 8 is in the region of the expanded insertion opening A. The latching jaws 14 are pushed out and back from their latched positions by the actuator head 8 and bear against the intermediate segments 24.

Then the actuator 3 is inserted farther into the safety switch 2, until it is in the latched position depicted in FIG. 3. In this latched position, the actuator head 8 has passed the latching jaws 14. The latching jaws 14 are therefore returned to their latched position by the spring forces, such that their free ends bear against the connection element 7 of the actuator 3 with little play. The latching jaws 14 then grip behind the actuator head 8, whereby the actuator 3 is securely latched by the spring forces that keep the latching jaws 14 in their latched positions. Locking is still deactivated. This state is shown in FIG. 5B. In this state, the actuator can still be unlatched under load, since the actuator 3 can be pulled by force out of the latching unit 12.

Next, as depicted in FIG. 5C, locking is activated, such that the link 18 is rotated against unlocking.

When the safety switch arrangement 1 according to the invention is used to secure a safety door serving as access to a hazard area, the safety switch 2 can, when the actuator 3 is latched and locked, emit a switching signal that can be used to release a hazardous system within the hazard area for operation.

Figure 6:
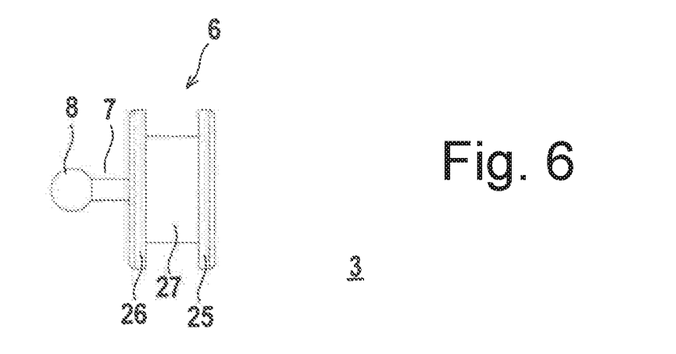
FIG. 6 Another embodiment of the actuator.

FIG. 6 shows another embodiment of the actuator 3 according to the invention. The actuator 3 again has a core body 6, a connection element 7, as well as a sphere-shaped actuator head 8. A transponder, which is not shown, can be arranged in the actuator head 8 or core body 6.

The connection element 7 protrudes perpendicularly from the surface of the core body 6 and has the shape of a cylinder. In general, the connection element 7 can have other shapes. For example, the connection element 7 can be a steel cable.

The core body 6 is formed as a receptacle that can be inserted, in particular, snapped into place in a recess of a safety door, the core body 6 in the latter case being elastically deformable, which is not mandatory, however.

The core body 6 has two circular disc-shaped segments 25, 26, which are separated by a cylindrical segment 27. The axes of symmetry of these segments coincide with the longitudinal axes of the connection element 7. The diameters of the circular disc-shaped segments 25, 26 are larger than the diameter of the cylindrical segment 27. In general, the segments 25, 26, 27 can also have other geometries.

The actuator 3 can be mounted in a recess of the door such that the edge of the door bounding the recess tightly abuts the cylindrical segment 27. The circular disc-shaped segments 25, 26 of the core body 6 then overlap external and internal wall segments of the door adjacent to the edge, thereby securing the actuator head 8 against slipping out of the door.

Figure 7:
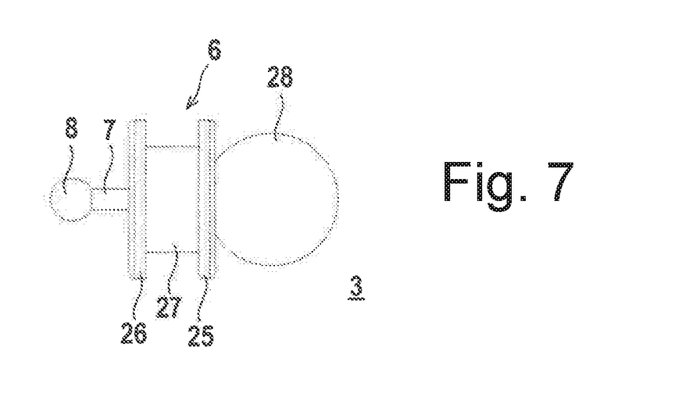
FIG. 7 Variant of the embodiment according to FIG. 6.

FIG. 7 shows a variant of the embodiment according to FIG. 6. The actuator 3 according to FIG. 7 has the same structure as the actuator 3 according to FIG. 6; however, a handle element 28 with which a person can open and close the door is additionally provided on the front side of the core body 6 facing away from the actuator head 8.

Figure 8:
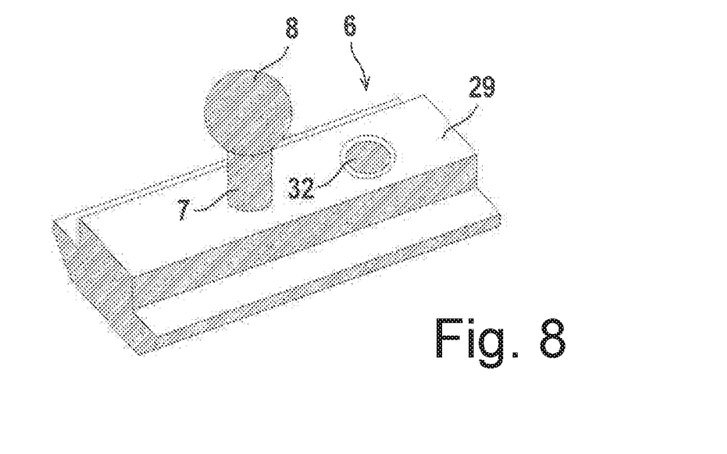
FIG. 8 Another embodiment of the actuator.

FIG. 8 shows another embodiment of the actuator 3 according to the invention with a core body 6, a cylindrical connection element 7 and a sphere-shaped actuator head 8.

In this case, the core body 6 is formed by a slot nut 29. A transponder 10 can be integrated into the actuator head 8 or the slot nut 29.

The core body 6 formed as the slot nut 29 can be simply integrated into a profile 30 by inserting it into a profile slot 31 of the profile 30 (FIG. 9A), where it is fixed with a grub screw, not shown here, which engages with a hole 32 of the slot nut 29.

Figure 9A:
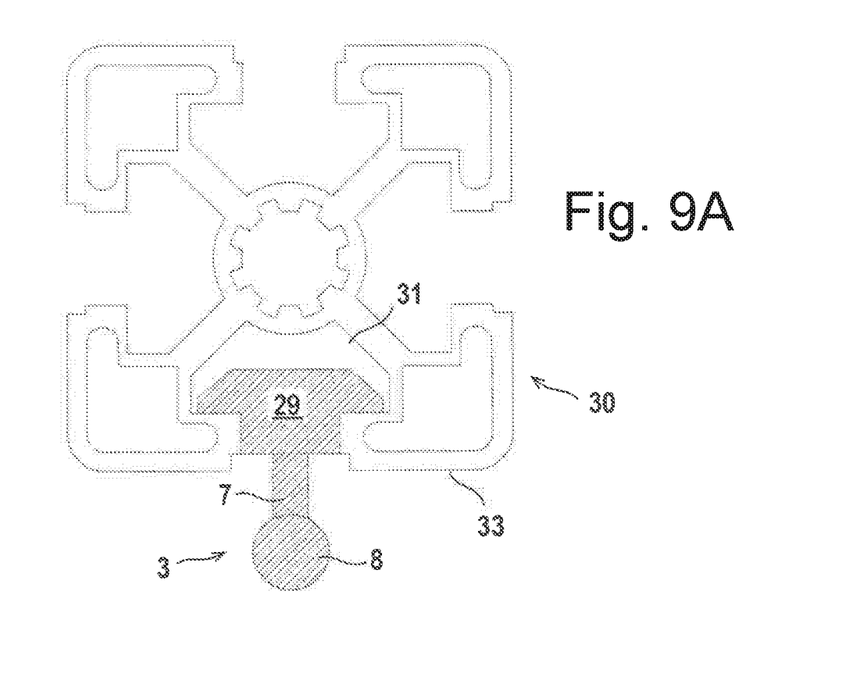
FIG. 9A Integration of the actuator into a profile without a slot cover

As FIG. 9A shows, the slot nut 29 is mounted in the profile slot 31 such that the face of the slot nut 29, from which the connection element 7 exits, is mounted with an inward offset vis-à-vis the outside 33 of the profile 30.

Figure 9B:
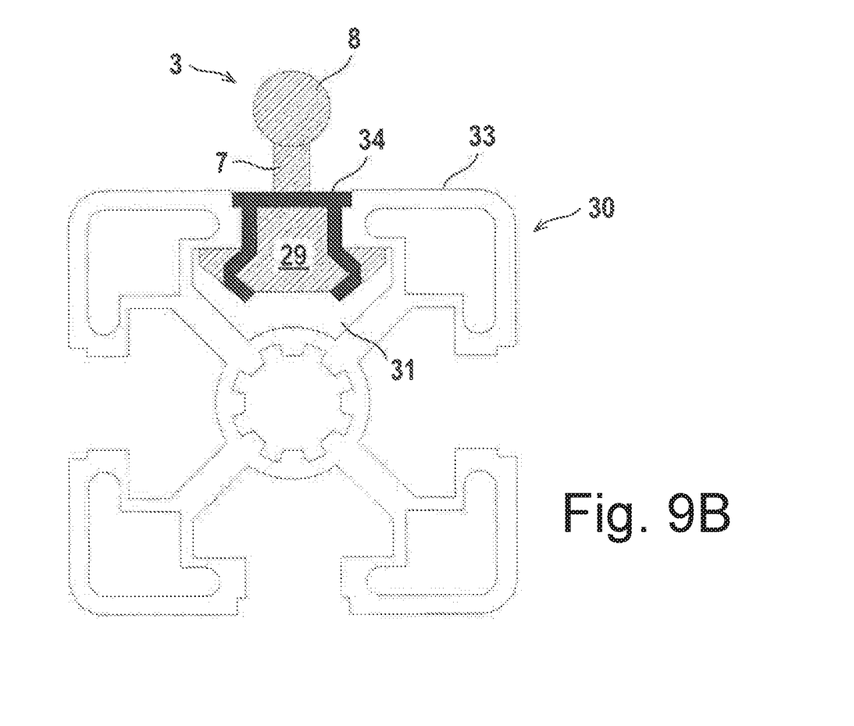
FIG. 9B Integration of the actuator into a profile with a slot cover

As FIG. 9B shows, a profile slot cover 34 can be placed on the slot nut 29 such that it covers the slot nut 29 and is flush with the outside of the profile 30. Thus, only the connection element 7 with the actuator head 8 protrudes outwards beyond the profile slot cover 34.

LIST OF REFERENCE NUMERALS (1) Safety switch arrangement
(2) Safety switch
(3) Actuator
(4) Housing
(4a) Front wall
(5) Cable connection
(6) Core body
(7) Connection element
(8) Actuator head
(9) Guide
(10) Transponder
(11) Reading coil
(12) Latching unit
(13) Guide channel
(14) Latching jaw
(15) Spring unit
(16) Retro-reflective sensor
(17) Locking unit
(18) Link
(19) Toothing
(20) Cog wheel
(21) Electric motor
(22) Auxiliary unlatching element
(23) Segments
(24) Intermediate segment
(25) Circular disk-shaped segment
(26) Circular disk-shaped segment
(27) Cylindrical segment
(28) Handle element
(29) Slot nut
(30) Profile
(31) Profile slot
(32) Hole
(33) Outside
(34) Profile slot cover
(A) Insertion opening

The invention claimed is:

1. An actuator (3) for a safety switch (2) with an actuator head (8), said actuator head being mounted to a core body (6) by means of a connection element (7), the actuator head (8) at least in sections having a larger cross section than the connection element (7), the connection element (7) being rigid in the axial direction and the actuator head (8) being held by means of the connection element (7) in a base position in which the longitudinal axis of the connection element (7) runs at an angle of inclination to the surface of the core body (6), the safety switch (2) has a latching unit (12) by means of which the actuator (3) can be held in a latched position, wherein the latching unit (12) has an arrangement of latching jaws (14) that delimits an insertion opening (A) through which the actuator head (8) can be inserted into a latching position, and wherein the latching jaws (14) in latched positions grip behind the actuator head (8) and hold the actuator (3) in the latching position, and the actuator head (8), when passing the latching jaws (14), deflects the latching jaws (14) from the latched position.

2. The actuator (3) according to claim 1, characterized in that the actuator head (8) is a body formed rotationally symmetric to the longitudinal axis of the connection element (7).

3. The actuator (3) according to claim 2, characterized in that the actuator head (8) is sphere-shaped or has an oval or polygonal cross section.

4. The actuator (3) according to claim 1, characterized in that the actuator head (8) can be deflected along a plane extending transversely to the longitudinal axis of the connection element (7) and/or the connection element (7) is made of an elastically deformable material.

5. The actuator (3) according to claim 1, characterized in that the connection element (7) has an at least approximately constant cross section over its entire length.

6. The actuator (3) according to claim 1, characterized in that the connection element (7) is made of a metallic material, wherein in particular the connection element (7) is a steel cable.

7. The actuator (3) according to claim 1, characterized in that in the base position the longitudinal axis of the connection element (7) runs along a straight line oriented perpendicular to the surface of the core body (6).

8. The actuator (3) according to claim 1, characterized in that the length of the connection element (7) is adjustable.

9. The actuator (3) according to claim 1, characterized in that its core body (6) forms a receptacle by means of which the actuator (3) can be mounted in or on a door.

10. The actuator (3) according to claim 9, characterized in that the core body (6) has two circular disc-shaped segments (25, 26), connected by a cylindrical segment (27), which protrude beyond the cylindrical segment (27).

11. The actuator (3) according to claim 9, characterized in that the connection element (7) protrudes with the actuator head (8) from a first front side of the core body (6) and a handle element (28) is arranged on the opposite front side of the core body (6).

12. The actuator (3) according to claim 1, characterized in that the core body (6) is a slot nut (29) which can be integrated into a profile (30).

13. The safety switch arrangement (1) according to claim 1, characterized in that the actuator head (8) is automatically alignable by a deflection motion towards the insertion opening (A).

14. The safety switch arrangement (1) according to claim 1, characterized in that the safety switch (2) has a locking unit (17) assigned to the latching unit (12), which effects a locking of the actuator (3) in the latched position.

15. The safety switch arrangement (1) according to claim 1, characterized in that the latched position of the actuator (3) is monitored by capturing signals from a transponder (10) in the actuator (3) in a reader unit of the safety switch (2), wherein the transponder (10) is integrated in the actuator head (8) or in the core body (6).

* * * * *